United States Patent [19]

Abrams et al.

[11] Patent Number: 5,684,992

[45] Date of Patent: Nov. 4, 1997

[54] USER CONSOLE AND COMPUTER OPERATING SYSTEM ASYNCHRONOUS INTERACTION INTERFACE

[75] Inventors: Robert Michael Abrams; Patrick Reed Tracy, both of Wappingers Falls; William James Schoen, Poughkeepsie, all of N.Y.

[73] Assignee: International Business Machines Corporation, Armonk, N.Y.

[21] Appl. No.: 476,535

[22] Filed: Jun. 7, 1995

Related U.S. Application Data

[63] Continuation of Ser. No. 576,806, Sep. 4, 1990.
[51] Int. Cl.⁶ .................................................. G06F 9/00
[52] U.S. Cl. ........................ 395/670; 395/651; 395/680
[58] Field of Search ............................... 395/650, 700, 395/680, 651, 670

[56] References Cited

U.S. PATENT DOCUMENTS 4,823,304  4/1989  Frantz et al. ............................. 395/250
5,144,692  9/1992  Baker et al. ............................. 395/425
5,390,316  2/1995  Cramer et al. ............................ 395/425

Primary Examiner—Kevin A. Kriess
Attorney, Agent, or Firm—Lawrence D. Cutter

[57] ABSTRACT

A method for operating a computer system includes the identification of at least one of a plurality of consoles to the operating system so as to be able to dynamically specify console attributes. Furthermore, a unique command and response token value is provided for associating commands and subsequently generated responses or messages so that they may be directed to an appropriately select set of consoles as determined by the token value and the console attributes. These facilities provide a programmable and flexible interface to a computer and its operating system environment so as to facilitate the utilization of console devices for controlling the computer complex from one or more remote locations in a consistent, protected, efficient but yet flexible manner.

4 Claims, 2 Drawing Sheets

USER CONSOLE AND COMPUTER OPERATING SYSTEM ASYNCHRONOUS INTERACTION INTERFACE

This application is a continuation of application Ser. No. 07/576,806 filed Sep. 4, 1990.

BACKGROUND OF THE INVENTION

The present invention is generally directed to computer operating system interface mechanisms. More particularly, the present invention is directed to mechanisms for identifying computer consoles to an operating system and for further identifying and associating appropriate commands and subsequently issued responses and messages to those commands so that they may be directed to the appropriate user console. Accordingly, means are provided in a multiuser computer operating system environment for providing programmable interfaces into the operating system structure so as to permit the asynchronous handling of commands and their associated responses in an isolated and independent fashion.

Computing systems and their controlling operating systems have provided environments in which physical console devices have been identified to the operating system in a static fashion. Certain consoles have been predefined as operator consoles, master consoles or consoles associated with other operations control points. These consoles are often special purpose and contained within secure areas. However, an important trend in the usability, operation and maintenance of large computer systems has dictated a need to provide remote operation capabilities. Furthermore, user applications running in the computer system environment have had a great need to be able to communicate in a much more flexible fashion with the system operator and other users. However, in trying to carry out these goals, it is necessary to appreciate the strong desire to maintain system integrity while at the same time providing flexibility of access and a platform for establishing programmable and therefore dynamic interfaces into computer operating system facilities. Furthermore, it is desirable that these capabilities exist not only in computing environments including a single computer system, but environments which include computer system complexes which possess a plurality of separate computer systems, each perhaps having contained within themselves a plurality of processing elements.

SUMMARY OF THE INVENTION

In accordance with a preferred embodiment of the present invention a method is provided for operating a computer system which includes an operating system which supports multiple address spaces for storing programs and data and which also supports separate data spaces for data access. In particular, computer consoles are identified to the operating system in such a way as to include the specification of console attributes and associate the specification with an address for user applications. These attributes and a console identifier are employed in conjunction with a token value to establish a communications protocol for increased flexibility of console operation. Once a console has been identified to the operating system, commands are transmitted from it to the computer operating system by means of console support programs which run in one of the multiple virtual address spaces supported by the operating system. The commands are associated with a user specifiable token value. The command is then processed and responses and messages are associated with the token value and placed within a queue in a data space which is linked with its corresponding virtual address space for the appropriate console. These messages and responses are subsequently redirected to select consoles as determined by the token value and the console attributes. Thus, a data space is provided as a unique mechanism for the exchange of messages with the operator consoles in such a fashion so as to maintain console independence yet at the same time preserve overall system integrity and effectiveness in message handling. Moreover, user defined applications running on the computer system can now issue commands and fully expect to receive messages based on the issued commands. In this way a flexible, programmable and dynamic platform is provided to access operating system services. In particular, it is noted that the console attributes are dynamic and thus provide an even greater degree of flexibility to computer users and/or their applications running on the computer system.

Accordingly, it is an object of the present invention to be able to dynamically identify consoles to a computer operating environment.

It is also an object of the present invention to be able to control the specification of console attributes in a dynamic fashion.

It is yet another object of the present invention to provide primitive operations that are desirable for building a computer operator application which is operable in a plurality of service environments.

It is a still further object of the present invention to provide a means for associating commands and message responses to those commands in an ordered and prioritized fashion.

It is also an object of the present invention to provide messages which are isolated in separate data spaces.

It is yet another object of the present invention to provide independent message processing and display, thus freeing operations normally performed by operating system segments which are assigned responsibility for processing messages across the entire computer complex.

It is yet another object of the present invention to permit the receipt of unsolicited messages in addition to solicited command responses.

It is also an object of the present invention to increase the number of consoles that may be defined to a computer operating system environment.

Lastly, but not limited hereto, it is an object of the present invention to further the remote operations capabilities of a computer system and computer system complexes which are now controllable in a more dynamic and flexible fashion.

DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
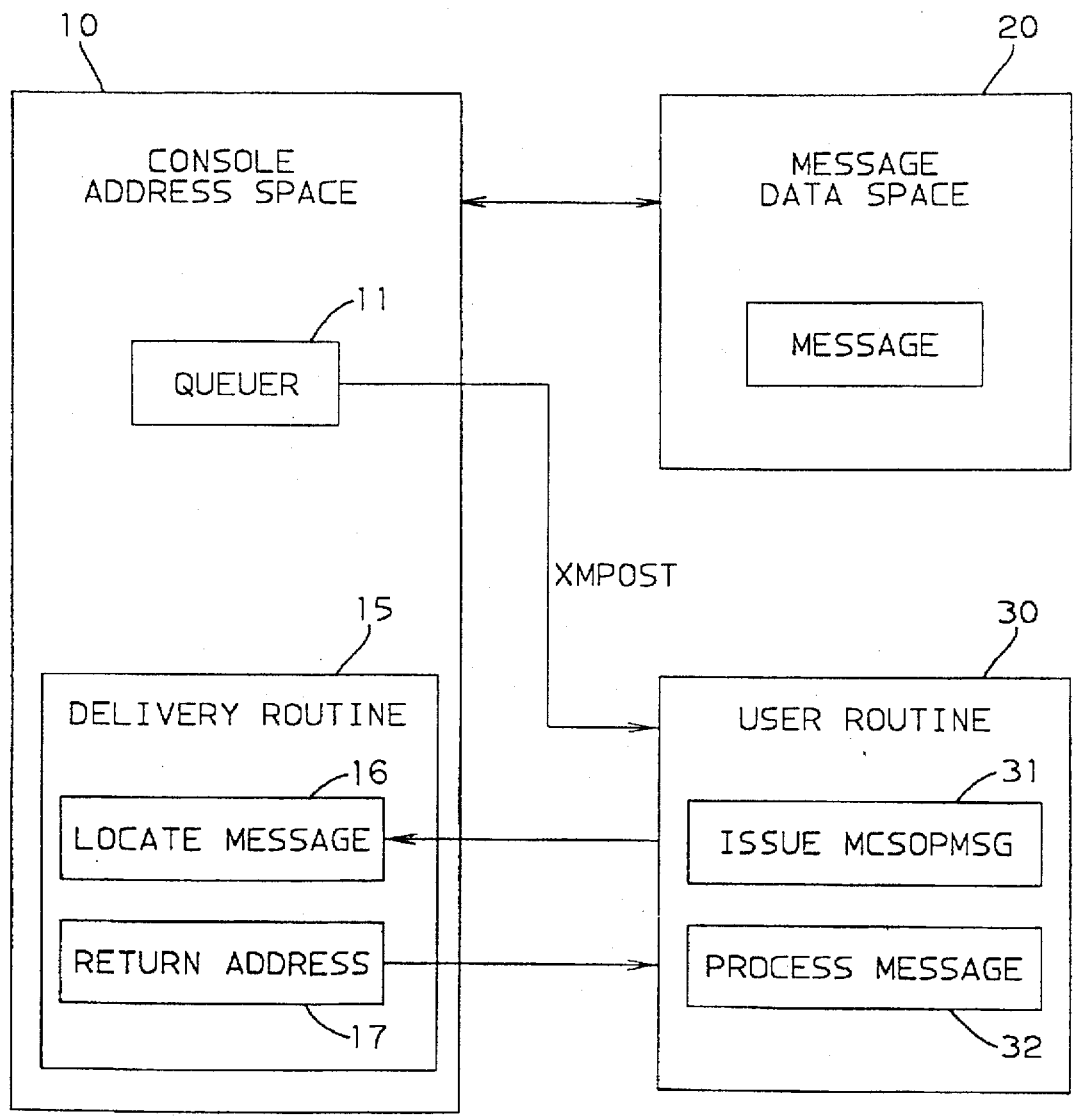
FIG. 1 is a functional block diagram illustrating an overall view of the address and data space structures employed in the present invention.

FIG. 1 illustrates in block diagram form the message delivery interface which is provided by the present invention. In particular, address space 10 possessing one or more active multiple console support (MCS) console sessions is associated with message data space 20. Data space 20 allows messages destined to users to be isolated in a separate location, thus allowing for better message integrity, and avoiding a strain on other communication services within a computer system or complex. As both solicited and unsolicited messages are targeted to be queued by queuer 11 to "extended" operators, they are placed in data space 20. A macro command, MCSOPMSG, more particularly described below allows users to retrieve system messages from message data space 20 and to distinguish solicited from unsolicited messages and allowing further message filtering through the use of a command and response token (CART) value.

This structure permits a user routine 30, typically executing in a different address space to invoke MCSOPMSG macro 31 to delivery routine 15 running in console address space 10. Delivery routine 15 includes two steps a "locate message" step 16 which retrieves an appropriate message from message data space 20. Delivery routine 15 also includes a return address needed by that portion of the user routine 30 which processes message 32 for returning control to the console address space.

The message delivery service operates as follows. An MCS console interface allows authorized applications to function as an "extended" MCS console. An extended MCS console is a logical console from which operators can issue commands and receive messages. An authorized user can, for example, issue the TSO/E CONSOLE command to establish an extended MCS console session and to introduce operator commands to the system. This function is carried out by invoking the MCSOPER macro which allows the application to define the console specification and its attributes. The MCSOPER macro has three functions illustrated by three different invocation parameters. For example, if MCSOPER is invoked with the REQUEST parameter set equal to ACTIVATE, processing is initiated which defines and activates an extended MCS console to the computer system. If the parameter list recites "REQUEST"= "DEACTIVATE" an extended MCS console is identified as inactive and the session is terminated. Lastly, it is possible to invoke the MCSOPER service-with "REQUEST= RELEASE" specified as part of the parameter list which results in the release of migration identifiers which are more particularly described below.

The MCSOPMSG service is used in conjunction with MCSOPER processing to retrieve messages that the console address space program has stored and to resume message queuing to an extended MCS console which is identified by the MCSOPER service if message queuing was suspended.

One of the aspects of the present invention is the identification of a console to a computer system environment. Accordingly, discussion of the activation of an extended MCS console is provided. The MCSOPER service with the parameter REQUEST set equal to ACTIVATE defines and activates an extended MCS console to the system, as described above. When you specify this parameter, the system creates an area to store messages unless one also specifies the message delivery parameter, MSGDLVRY as NONE during invocation of MCSOPER. One can also specify how MCSOPMSG retrieves messages.

MCSOPER attempts to get the OPERPARM parameter list from a resource allocation control facility such as RACF, a system security product sold by the present assignee, so that MCSOPER can obtain installation defined operator information such as attributes for the console. If RACF is not active or there is no user segment defined in RACF, MCSOPER takes the address of the OPERPARM parameter list from OPERPARM option of the macro. If MCSOPER cannot get the OPERPARM parameter list from either RACF or the OPERPARM option, it defaults to zero. The default of zero provides an indication to MCSOPER to take the operator information from another default list.

The following table summarizes key words employed in the OPERPARM parameter list. This parameter list contains fields with values that control console attributes for extended MCS consoles. These are discussed in detail below.

TABLE 1

| OPERPARM KEYWORD | FUNCTION |
|---|---|
| AUTH | Command authority |
| ROUTCODE | Routing codes |
| LEVEL | Levels of messages |
| MFORM | Message format for display |
| MSCOPE | System message scope in a sysplex |
| CMDSYS | Command scope in the sysplex |
| MONITOR | Jobname and TSO information for displays |
| LOGCMDRESP | Logging of command responses |
| MIGID | Whether the console receives a 1-byte migration ID |
| STORAGE | Limit of storage in megabytes (MB) used for message queuing |
| DOM | Whether the console receives delete operator message request (DOM) |
| KEY | 1 to 8-byte name used on DISPLAY C command to identify extended MCS consoles |
| UD | Whether the console displays undelivered messages |
| ALTGRP | Specifies the name of a list of alternate consoles in the event of abnormal event occurrence. |
| AUTO | Provides additional routing characteristics for processing by other routings which automate operations |
| SUPPRESS | Indicates whether messages which have been suppressed are still routed to the console. |

The AUTH parameter variable specifies the command authority LEVEL for the console. The operating system determines command authority by command groups defined as follows: Information Commands, System Control Commands, I/O Control Commands, Console Control Commands and Master Console Only Commands. An additional group of AUTH commands includes all of the above levels except for the Master Console Only Commands. Command and group authority preferably provide that commands from groups with higher authority are also authorized to issue commands in the groups with lower authority. For example, the System Control Command authority designation allows the user to issue Information Commands as well as System Control Commands from the console. An Informational Command authority level is preferably selected as a default.

The ROUTCODE keyword value specifies a routing code in effect for the console. The operating system directs messages with defined routing codes to the console. It is also preferable that the user is provided with the opportunity to specify a ROUTCODE "value" of "ALL", which sends all messages defined by routing codes to the console, or a routing code of NONE which sends no messages defined by the routing code to the console and this is preferably selected as the default value.

The LEVEL keyword specifies a message level for the console. The system distinguishes between kinds of message levels defined as options in the following fashion. The most important level is reserved for write to operator with reply (WTOR) messages which demand an immediate reply. Next in priority are the "system failure" and "immediate action" messages which indicate that a serious error has occurred or that a task is awaiting a requested operator action. Next most important in terms of level are the critical, eventual-action messages which indicate that an eventual action of critical importance is requested on the part of the operator. Thus, in this case, the importance is "eventual" as opposed to "immediate". Next in terms of level are the eventual action messages which request an eventual action that does not require immediate operator attention. Next in terms of priority are informational messages which generally indicate system status. Most messages are generally informational. Next in terms of priority level are "broadcast" messages which are messages normally sent to every active console regardless of the routing code assigned to the console. It is also possible to specify via the LEVEL parameter that the console is not to receive broadcast messages.

Also, it is preferable to include a LEVEL parameter value which permits all the messages including broadcast mesages to appear on the console being defined to the system.

Another parameter that is preferably provided is used to define the message format for messages that appear on the console. In the present invention the parameter MFORM is used by the operating system to distinguish various formats such as whether or not the text of the message is displayed without a time stamp job ID or job name. Another value of MFORM specifies that the system displays the job name or ID along with the message text. Another choice for the MFORM parameter value specifies that the console displays the name of the system that originated the message. Another choice of MFORM value specifies that the system display a time stamp with the message. Also, it is possible via choice of the MFORM parameter to suppress the job name and system name for job entry subsystem messages issued from a global processor.

Another parameter specifiable in the OPERPARM list specifies that one can display certain status information on the console screen. For example, it is possible to specify that the name of the job is displayed in status display areas whenever the job starts and stops. It is also possible to specify that data set names and volume serial numbers are displayed in status display areas whenever data sets are freed. It is also possible to specify that a session user identifier is displayed whenever a session begins and/or ends. Additionally, a time or data stamp may be displayed at session beginnings or at job starts.

Furthermore, when the present invention is operating in a computer complex comprising a plurality of relatively independent computer systems arranged in a loosely coupled complex, it is desirable to employ another OPERPARM parameter, MSCOPE, which is capable of defining certain systems that can send messages to the console that are otherwise not explicitly routed to the console. In the present invention, this parameter value has been set to a default of "ALL" which indicates that messages from the local system as well as all other systems in the complex are capable of appearing on the console.

The present invention is also capable of defining, via the value of the CMDSYS parameter in the OPERPARM list, a system in a complex where commands entered on this particular console are sent for processing. The preferable default value set so that commands entered on the console are processed on the local system where the console is defined.

The present invention also provides the capability of specifying a value for the LOGCMDRESP parameter in OPERPARM so as to control whether messages that are responses to commands directed to the console are logged into a hard copy log.

The OPERPARM parameter MIGID specifies a one byte long migration identification field assigned to the console. The migration identifier allows command processors that use a one byte console identifier to direct command responses to the console. One value of the MIGID parameter specifies that the system should assign a migration identifier to the console. Another value of the parameter indicates that the console does not require a migration identifier and this is the default value used.

Another parameter that is specifiable to the MCSOPER service macro via the OPERPARM list is the STORAGE parameter. This specifies the limit of storage in megabytes that is used for message queuing. When the console is activated, the system sets the limit. Another OPERPARM parameter, DOM, specifies whether the console receives delete-operator messages. A "NORMAL" value for this parameter list item indicates that the system attempts to queue all appropriate delete operator messages to the console, and is the default. Another setting for this parameter provides that all systems in the complex queue delete operator messages to the console. The application program that activates the console must handle any message deletion as specified by the DOM signal.

The OPERPARM parameter KEY specifies a one to eight byte character name that enables one to define a KEY that computer operators may use to display information about all extended MCS consoles in the system or complex.

Lastly, the OPERPARM parmeter UD specifies whether the console is to receive action messages and WTOR messages that the system could not display.

In addition, the present invention provides different ways to receive messages depending upon the desired method for retrieval. For example, if one specifies MSGDLVRY= "FIFO" to the MCSOPER macro, messages are extracted from the storage area on a first in first out (FIFO) basis. If instead, one specifies "MSGDLVRY=SEARCH" to MCSOPER then the search arguments CMDRESP, CART and MASK are used by the MCSOPMSG macro for retrieving a message when the REQUEST parameter for MCSOPMSG is set equal to GETMSG. Likewise, if one specifies "MSGDLVRY=NONE" to the MCSOPER macro then no message storage area is created. This latter specification requires that one retrieves messages from either the write to operator macro (WTO) subsystem interface or a message processing facility exit. This facility is provided principally to support prior mechanisms for message processing.

In the present invention, one can also specify the number of messages stored for an extended MCS console. This is provided in the QLIMIT keyword for the MCSOPER macro. This allows one to define a maximum number of messages that may be queued to such consoles. When the number of messages in the message storage exceeds the specified queue limit value, queuing to the storage area stops. Additionally, in the present invention, when the extended MCS console is activated one can specify that when the maximum number of messages that can be queued is exceeded and queuing stops, it is possible to resume queuing when the amount of message storage used reaches a specified percentage of the message capacity as defined by the QLIMIT keyword. Another parameter, QRESUME, specifies a user definable percentage of queued messages at which queuing to the data space is resumed.

Attention is now directed to the mechanism involved with retrieving messages from the message storage area by using the MCSOPMSG macro with REQUEST set equal to GETMSG. This not only retrieves messages from the message storage data space but also frees storage for new messages. Messages are retrieved by specifying certain characteristics of the message. In particular, the CMDRESP option of the MCSOPMSG macro allows one to retrieve a message that is a command response (CMDRESP set equal to YES) or an unsolicted message (CMDRESP set equal to NO). If you choose to retrieve a command response, you can further specify the message command and response token (CART) which associates a response with a command, and with the CART one can also specify a mask. A command and response token allows one to specify the selection criteria when retrieving command messages. In one instance, a mask is used as a value that is compared to a command and response token (CART) with the logical AND instruction being used to broaden that selection criteria. For example, MCSOPMSG may be effectively employed to retrieve any command responses having a specified first four characters for the command and response token. If one does not specify a value for CMDRESP, the MCSOPMSG macro retrieves the first message in the queue in the data space on a first in, first out (FIFO) basis. When the MCSOPMSG macro returns control, a specified general purpose register and an access register (AR) is used to point to the particular message in the Message Data Block (MDB).

In the present invention, queue message limits may be managed by specifying the MCSOPMSG macro with REQUEST set equal to GETMSG so that one can retrieve sufficient numbers of messages to meet the above specified QRESUME percentage requirements specified in the MCSOPER macro.

After queuing stops, for example after an abnormal end condition occurring in a computer system, one can resume queuing to the message storage area by specifying the MCSOPMSG macro with the REQUEST parameter set equal to RESUME. However, the "REQUEST=RESUME" specification enables one to request that the system resume queuing. If queuing does stop, MCS routes important messages not queued anywhere else to consoles having the UD attribute as defined above.

Additionally, it is possible to employ the MCSOPER macro with REQUEST set equal to a ACTIVATE to provide a way to check message status. In this case MCSOPER processing posts an event control block (ECB) if any of the following are true: the number of messages in the message storage area has reached the number specified in QLIMIT; the number of messages in the message storage area has filled the percent of the QLIMIT number specified by an ALERTPCT value; the message storage has no space for more messages; or a queuing error occurs. When MCSOPER posts the event control block, one should check the MCS console status area to determine which of these problems has disabled the queuing function. These are separately provided by the users and do not constitute part of the present invention.

The present invention also provides the capability for deactivating extended MCS consoles and releasing migration identifiers. In particular, invocation of the MCSOPER macro with the REQUEST parameter set equal to DEACTIVATE identifies the extended MCS console that is specified as inactive and terminates the session. In order to release a migration ID one preferably first issues a DISPLAY CONSOLES command to display the migration IDs that one can supply as input to the MCSOPER command with REQUEST set equal to RELEASE. The migration ID as specified above, is preferably the one byte console identifier that is used in user programs prior to conversion by the programs to a four byte console identifier. In this mechanism, there is a limited number of migration IDs. However, one can reuse migration identifiers that have been returned. Subsequent to the DISPLAY command the MCSOPER macro is issued with REQUEST set equal to DEACTIVATE then the MCSOPER command is invoked again with REQUEST set equal to RELEASE so as to release and return the migration ID. The migration ID is specified with the MIGID keyword described above.

Figure 2:
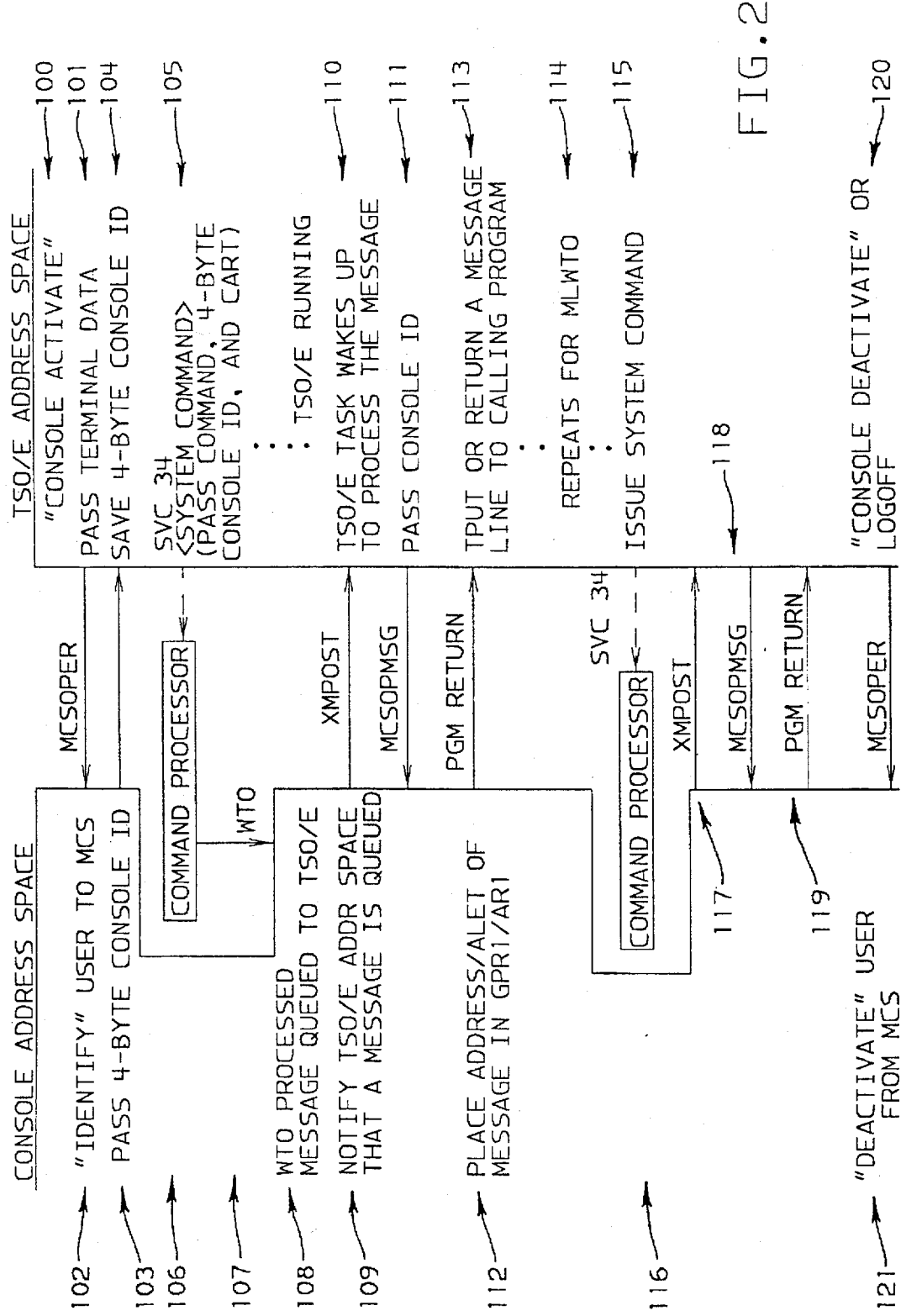
FIG. 2 is a stylized flow chart illustrating the interaction between a console support program running in a console address space with the computer operating system running in its address space.

Attention is next directed to the sequence of operations and interchanges as shown in FIG. 2. In particular, this figure illustrates the data flow and command sequence that occurs between programs running the console address space and programs running in a user address space such as that assigned by a time share operating system such as the TSO/E product which runs under the MVS operating system products of the assignee of the present invention. Upon initiation of a console activate sequence 100, terminal data is first passed (step 101) via the above described MCSOPER macro to the console address space where the newly activated console is identified (step 102) to the multiple console support service. Subsequently, the program running in the console address space passes (step 103) a 4-byte console identifier to the user's TSO/E address space where it is saved (step 104) as a 4-byte console identifier. Subsequently, a supervisor call (SVC) instruction (with a code of 34 in the MVS operating system) is supplied to a command processor (step 105). Step 105 passes a system command, a 4-byte console ID and the above described command and response token (CART) to the command processor which receives it (step 106), handles the user's request and issues a write to operator (WTO) macro (step 107). The WTO macro is processed (step 108) by the program running in the associated console address space. The message received is queued for delivery to the TSO/E address space which is notified (step 109) that a message is queued through the invocation of the XMPOST macro. TSO/E then "wakes up" (step 110) to process the message and subsequently passes the console identifier (step 111) to the console address space routine by means of the above described MCSOPMSG macro. See also FIG. 1 with respect to the operation of the XMPOST macro. Next, the console address space programming places an address of the message in general purpose register 1. Also, an access list entry table (ALET) for the message is placed in access register 1 (step 112). Control is then returned to the program running in the TSO/E address space which invokes a service to place a message on a TSO/E terminal or returns a message line to the calling program (step 113) which may for example be a REXX exec. In the case of a multiple line write to operator command, this step is repeated (step 114). Finally, subsequent system commands may be issued (step 115) via service call (SVC) 34 as above to the command processor which processes the command (step 116). It is noted that the command processor may run in any of the following address spaces: the TSO/E user's address space; the master scheduler address space; the CONSOLE address space; the subsystem address space (for example the JES2 or JES3 address space); or any MVS system address space.

Subsequent control continues in the CONSOLE address space. Further operations occur as described above where the typical sequence is the message queuing and posting operation (step 117) followed by invocation in the TSO/E address space of the MCSOPMSG macro (step 118) and the subsequent program return from the console address space (step 119). Finally, a console DEACTIVATE or LOGOFF command may be issued in the TSO address space (step 120) which in turn invokes the MCSOPER macro resulting in the deactivation of the user from the MCS system (step 121).

Attention is now directed to the MCSOPMSG macro which is used with parameters that specify either that the command is being used for retrieving messages or with an indication that it is being used for the purpose of reviewing message queuing. It is specifiable with a number of different parameters. In particular, the parameter CONSID specifies the address of the console ID. CONSID is a required parameter. Another parameter that is specifiable is the CMD-RESP parameter which specifies the type of message search being requested. At this particular parameter set equal to "NO" then the next unsolicited message is returned. If this parameter is set equal to "YES" then the next command/response message is returned. This parameter is optional. If it is not specified then the preferred embodiment of the present invention provides that the first undelivered message in the queue is returned. Another parameter specifiable to the MCSOPMSG macro is the command and response token (CART) described above. The CART specifies the next message returned contains the CART. The CART parameter is an optional parameter and is used only if CMDRESP= YES is specified. Lastly, it is preferable to supply a MASK parameter to the MCSOPMSG macro. The MASK parameter specifies that the CART in the message and the requested CART be logically ANDed with the MASK before the test is made which determines that the message contains the same CART as what was requested. MASK is an optional parameter in preferred embodiments of the present invention.

The Message Delivery Request routine passes return codes indicating various results. For example, it is desired to indicate successful processing. It is also preferred to provide an indication of successful processing but to qualify that with the fact that message queuing to the console is currently disabled. It is also possible to indicate via this request routine that no messages are available for the specified search criteria. It is also possible to indicate that no messages are available for the specified search criteria but message queuing to the console is currently disabled. It is also desirable to provide indications of the console not being active or that the console is not activated by the address space from which MCSOPMSG was called. Improper MCSOPMSG calls result in the return of certain reason codes that might for example indicate an invalid parameter list or that the caller is not in access register (AR) mode or that another MCSOPMSG request is in progress for this console. This latter aspect applies only to consoles with first in first out delivery specified.

From the above, it should be appreciated that applicants have combined the best features of virtual address spaces and data spaces as a communication mechanism for use in a computer system or in a complex of computer systems. It should also be appreciated that applicants have provided a mechanism for the interchange of messages between consoles in an orderly and deliberate fashion so as to be particularly able to match commands and responses thereto in a manner which facilitates the use of console devices for control of the computer system or computer complex. It should also be appreciated that applicants invention has provided data structures which significantly enhance the ability to define console devices to a computer system in a flexible but yet orderly fashion so as to preserve system integrity and to facilitate message delivery and handling through the utilization of queued message entries in a data space which is uniquely associated with a console address space.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for operating a computer system which includes an operating system supporting multiple address spaces for programs and data and which also supports data spaces for data access, said computer system further including a plurality of consoles for communicating with said computer system, said method comprising the steps of:

identifying at least one of said consoles to said operating system, including a specification of console attributes;

transmitting at least one command from one of said identified consoles to said computer system by means of console support programming which is active in one of said multiple address spaces;

associating said command with a token value;

processing by said operating system said command and generated responses or solicited messages with respect thereto which are also associated with said token value and placed in a queue in one of said data spaces; and subsequently selecting said queued responses or messages as determined by said token value.

2. The method of claim 1 in which said attributes include at least one selected from the list consisting of command authority, routing code, message level, message display format, command scope, migration identifier and storage limit.

3. The method of claim 1 in which said computer system comprises a plurality of separate loosely coupled computers.

4. The method of claim 1 in which said queued messages or responses are processed in first-in, first-out order.

* * * * *